UNITED STATES PATENT OFFICE 2,389,659

PROCESSING OF HYDROCARBONS

Eric William Musther Fawcett and Eric Sylvester Narracott, Sunbury on Thames, England, assignors to Anglo-Iranian Oil Company Limited, London, England, a British joint-stock company No Drawing. Application May 21, 1942, Serial No. 443,980. In Great Britain April 7, 1941

9 Claims. (Cl. 260—683.5)

This invention relates to the conversion wholly or in part of normal aliphatic hydrocarbons such as n-butane and n-pentane or materials containing substantial proportions of such hydrocarbons, into the corresponding branched chain hydrocarbons such as isobutane and isopentane or into mixtures containing substantial proportions of branched chain hydrocarbons of lower molecular weight, for example the conversion of n-pentane to isobutane.

In such processes it is customary to employ as contact catalyst certain anhydrous metallic halides of which aluminum chloride is typical, while in order to increase the activity of the aluminium halide it is usually found desirable to employ an activating agent such as hydrogen chloride or water.

The invention has among its objects to increase substantially the activity of the catalyst and to accelerate the conversion of normal to branched chain hydrocarbons.

According to the invention, an aluminium halide is used as catalyst preferably in conjunction with a hydrogen halide, but in the presence also of a proportion of a volatile sulphur compound of the type

where R₁ and R₂ are hydrogen or alkyl radicals, and R₁ and R₂ may be identical hydrogen or alkyl radicals or respectively hydrogen and alkyl radicals. A typical example of such sulphur compounds is ethyl mercaptan —$C_2H_5(H)S$. The proportion of the sulphur compound to be used corresponds to an upper limit of 5% of sulphur by weight of the hydrocarbon raw material.

The process may be carried out in the liquid or vapour phase, and either in batch or continuous operation.

In a preferred mode of operation, a continuous stream of a mixture of the hydrocarbon raw material in vapour phase, a hydrogen halide, advantageously hydrogen chloride, and the sulphur compound are passed through a reaction vessel containing the aluminium halide catalyst in granular or other suitable form, such for example as in admixture with or supported on a porous carrier, the reaction vessel being maintained at a determined temperature and pressure. The product leaving the reaction vessel and containing substantial amounts of branched chain hydrocarbons may be fractionated, for example by distillation, in order to separate partially or completely the normal and branched chain hydrocarbons. The normal hydrocarbons may be recycled to the same or other reaction vessel.

The hydrogen halide and/or the volatile sulphur compound may also be recovered and recycled to the same or other reaction vessel.

The reaction may be carried out at an elevated temperature, in no case however exceeding 300° C., and generally in the temperature range 50–200° C. Superatmospheric pressure, not exceeding 100 atmospheres, should generally be employed and if desired, the catalytic materials may be used together with water, being a known catalyst activator, instead of or together with a hydrogen halide.

The enhanced activity of the catalyst under the conditions hereinbefore described is demonstrated in the following experiment.

*Example.*—n-Butane containing 17.1% by volume of hydrogen chloride was passed at a rate of 13.6 gas volumes per volume of catalyst per hour through a reaction vessel containing granular aluminium chloride, and maintained at 123° C. and at atmospheric pressure. The gas leaving the reaction vessel was found to contain 13.8% isobutane.

A n-butane feed-stock containing .4% by weight of ethyl mercaptan and containing 17.1% by volume of hydrogen chloride was then passed at the same rate through the same reaction vessel containing the same sample of catalyst and maintained at 123° C. and at atmospheric pressure. Samples of the issuing gases were taken at frequent intervals, and analysed for iso-butane content; the results are tabulated below:

| Catalyst | Time from commencement of experiment, hours | Conversion percent isobutane in product |
|---|---|---|
| AlCl₃+HCl | | 13.8 |
| AlCl₃+HCl+C₂H₅(H)S | .75 | 18.8 |
| | 2.0 | 20.9 |
| | 8.0 | 27.1 |
| | 13.0 | 30.5 |
| | 20.0 | 31.0 |
| | 34.0 | 33.4 |
| | 40.0 | 29.6 |
| | 46.0 | 31.6 |

Thus by the use of the ethyl mercaptan as a catalyst activator under the conditions referred to, the reaction rate is about 2.5 times greater than that observed under equivalent conditions in its absence.

We claim:

1. A process which comprises isomerizing at least one normal paraffin containing at least four carbon atoms per molecule in the vapor phase at a temperature between 50° and 300° C. and superatmospheric temperature while in contact with an aluminum halide and in the substantial continuous presence of a compound of the type RSH wherein R is selected from the group consisting of alkyl and hydrogen.

2. A process which comprises isomerizing at least one normal paraffin containing at least four carbon atoms per molecule in the vapor phase at a temperature between 50° and 300° C. and superatmospheric temperature while in contact with an aluminum halide and in the substantial continuous presence of a compound of the type RSH wherein R is selected from the group consisting of alkyl and hydrogen and wherein the reaction is further promoted with the aid of a hydrogen halide.

3. A process which comprises isomerizing at least one normal paraffin containing at least four carbon atoms per molecule in the vapor phase at a temperature between 50° and 300° C. and superatmospheric temperature while in contact with aluminum chloride and in the substantial continuous presence of a compound of the type RSH wherein R is selected from the group consisting of alkyl and hydrogen.

4. A process which comprises isomerizing at least one normal paraffin containing at least four carbon atoms per molecule in the vapor phase at a temperature between 50° and 300° C. and superatmospheric temperature while in contact with aluminum chloride and in the substantial continuous presence of a compound of the type RSH wherein R is selected from the group consisting of alkyl and hydrogen and wherein the reaction is further promoted with the aid of hydrogen chloride.

5. A process which comprises isomerizing at least one normal paraffin containing at least four carbon atoms per molecule in the vapor phase at a temperature between 50° and 300° C. and superatmospheric temperature while in contact with aluminum chloride and in the presence of a lower alkyl mercaptan.

6. A process which comprises isomerizing at least one normal paraffin containing at least four carbon atoms per molecule in the vapor phase at a temperature between 50° and 300° C. and superatmospheric temperature while in contact with aluminum chloride and in the presence of a lower alkyl mercaptan and wherein the reaction is further promoted with the aid of hydrogen chloride.

7. A process as in claim 5 wherein the feed stock comprises essentially normal butane.

8. A process as in claim 5 wherein the feed stock comprises essentially normal pentane.

9. A process which comprises isomerizing normal butane at a temperature between about 50° C. and about 300° C. in the vapor phase, in the presence of aluminum chloride and promotional amounts of hydrogen chloride, wherein the reaction is carried out in the presence of between about 0.4 and about 5 weight per cent of ethyl mercaptan based on the normal butane feed.

ERIC WILLIAM MUSTHER FAWCETT.
ERIC SYLVESTER NARRACOTT.